US012420304B2

(12) United States Patent
Shida et al.

(10) Patent No.: US 12,420,304 B2
(45) Date of Patent: Sep. 23, 2025

(54) COATING APPARATUS AND COATING METHOD

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Naomi Shida, Minato (JP); Katsuyuki Naito, Bunkyo (JP); Yutaka Saita, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 313 days.

(21) Appl. No.: 17/819,378

(22) Filed: Aug. 12, 2022

(65) Prior Publication Data

US 2022/0379339 A1 Dec. 1, 2022

Related U.S. Application Data

(63) Continuation of application No. PCT/JP2021/008371, filed on Mar. 4, 2021.

(51) Int. Cl.

| | |
|---|---|
| ***B05C 11/02*** | (2006.01) |
| ***B05C 5/02*** | (2006.01) |
| ***B05C 13/00*** | (2006.01) |
| ***B05D 1/26*** | (2006.01) |
| ***B05D 1/40*** | (2006.01) |

(52) U.S. Cl.

CPC ............ *B05C 11/021* (2013.01); *B05C 5/027* (2013.01); *B05C 13/00* (2013.01); *B05D 1/26* (2013.01); *B05D 1/40* (2013.01)

(58) Field of Classification Search

USPC ....... 118/304, 313, 315, 708, 402, 404, 405; 427/355

See application file for complete search history.

(56) References Cited

U.S. PATENT DOCUMENTS

| | | | | |
|---|---|---|---|---|
| 2006/0152550 A1 | 7/2006 | Tomita et al. | | |
| 2009/0151626 A1 | 6/2009 | Naruse et al. | | |
| 2020/0395491 A1 | 12/2020 | Naito et al. | | |
| 2021/0178420 A1* | 6/2021 | Naito | ..................... | H10K 71/12 |

(Continued)

FOREIGN PATENT DOCUMENTS

| | | | | |
|---|---|---|---|---|
| CN | 111876670 A * | 11/2020 | .............. | B23P 15/00 |
| CN | 113631277 A | 11/2021 | | |

(Continued)

OTHER PUBLICATIONS

English Translation CN111876670 (Year: 2020).*

(Continued)

*Primary Examiner* — Yewebdar T Tadesse

(74) *Attorney, Agent, or Firm* — Oblon, McClellland, Maier & Neustadt, L.L.P.

(57) ABSTRACT

According to one embodiment, a coating apparatus includes a coating bar configured to face a member to be coated, and a plurality of nozzles configured to supply a liquid toward the coating bar. A number of the nozzles is 3 or more. An arithmetic mean roughness Ra of at least a part of a surface of the coating bar is not less than 0.5 μm and not more than 10 μm.

17 Claims, 5 Drawing Sheets

(56) References Cited

U.S. PATENT DOCUMENTS

| | | | | |
|---|---|---|---|---|
| 2021/0184127 | A1 | 6/2021 | Naito et al. | |
| 2021/0387222 | A1* | 12/2021 | Naito | B05C 1/0873 |
| 2021/0408378 | A1* | 12/2021 | Naito | B05C 11/1002 |
| 2022/0161292 | A1* | 5/2022 | Naito | B05C 1/0813 |
| 2022/0209151 | A1 | 6/2022 | Shida et al. | |

FOREIGN PATENT DOCUMENTS

| | | | | | |
|---|---|---|---|---|---|
| CN | 114302773 | A | | 4/2022 | |
| DE | 41 14964 | A1 | | 12/1991 | |
| DE | 198 14 689 | A1 | | 10/1999 | |
| DE | 10 2018 201 684 | A1 | | 8/2019 | |
| EP | 4 119 237 | A1 | | 1/2023 | |
| JP | 2000-346640 | A | | 12/2000 | |
| JP | 2001-899 | A | | 1/2001 | |
| JP | 2002045767 | A | * | 2/2002 | |
| JP | 2002-133652 | A | | 5/2002 | |
| JP | 2002-144722 | A | | 5/2002 | |
| JP | 2006-192622 | A | | 7/2006 | |
| JP | 2009-528913 | A | | 8/2009 | |
| JP | 5897749 | B1 | | 3/2016 | |
| JP | 5981599 | B1 | | 8/2016 | |
| JP | 2016-155113 | A | | 9/2016 | |
| JP | 2016-155114 | A | | 9/2016 | |
| JP | 2016-174992 | A | | 10/2016 | |
| JP | 2016-175033 | A | | 10/2016 | |
| JP | 2016-190202 | A | | 11/2016 | |
| JP | 2018-134576 | A | | 8/2018 | |
| JP | WO 2021/048923 | A1 | | 3/2021 | |
| JP | 2001131480 | A | * | 5/2021 | |
| KR | 10-2015-0132229 | A | | 11/2015 | |
| KR | 102037128 | B1 | * | 10/2019 | |
| WO | WO 2021/176518 | A1 | | 9/2021 | |
| WO | WO 2021/181445 | A1 | | 9/2021 | |
| WO | WO-2021176606 | A1 | * | 9/2021 | B05C 11/1002 |

OTHER PUBLICATIONS

English Translation JP2002045767A (Year: 2002).*

KR102037128B1 (Year: 2019).*

English Translation JP2001-131480A (Year: 2001).*

International Search Report issued May 18, 2021 in PCT/JP2021/008371, filed on Mar. 4, 2021 (with English Translation of Categories of Cited Documents), 4 pages.

Combined Chinese Office Action and Search Report issued Oct. 17, 2024 in Chinese Application 202180016238.1, 10 pages.

Extended European Search Report Issued Jan. 7, 2025 in European Patent Application 21925103.0, 8 pages.

* cited by examiner

COATING APPARATUS AND COATING METHOD

CROSS-REFERENCE TO RELATED APPLICATIONS

This is a continuation application of International Application PCT/JP2021/008371, filed on Mar. 4, 2021; the entire contents of which are incorporated herein by reference.

FIELD

Embodiments described herein relate generally to a coating apparatus and a coating method.

BACKGROUND

There is a coating apparatus that coats liquid using a coating bar. A coating apparatus capable of forming a uniform coating film is desired.

DETAILED DESCRIPTION

Figure 1A:
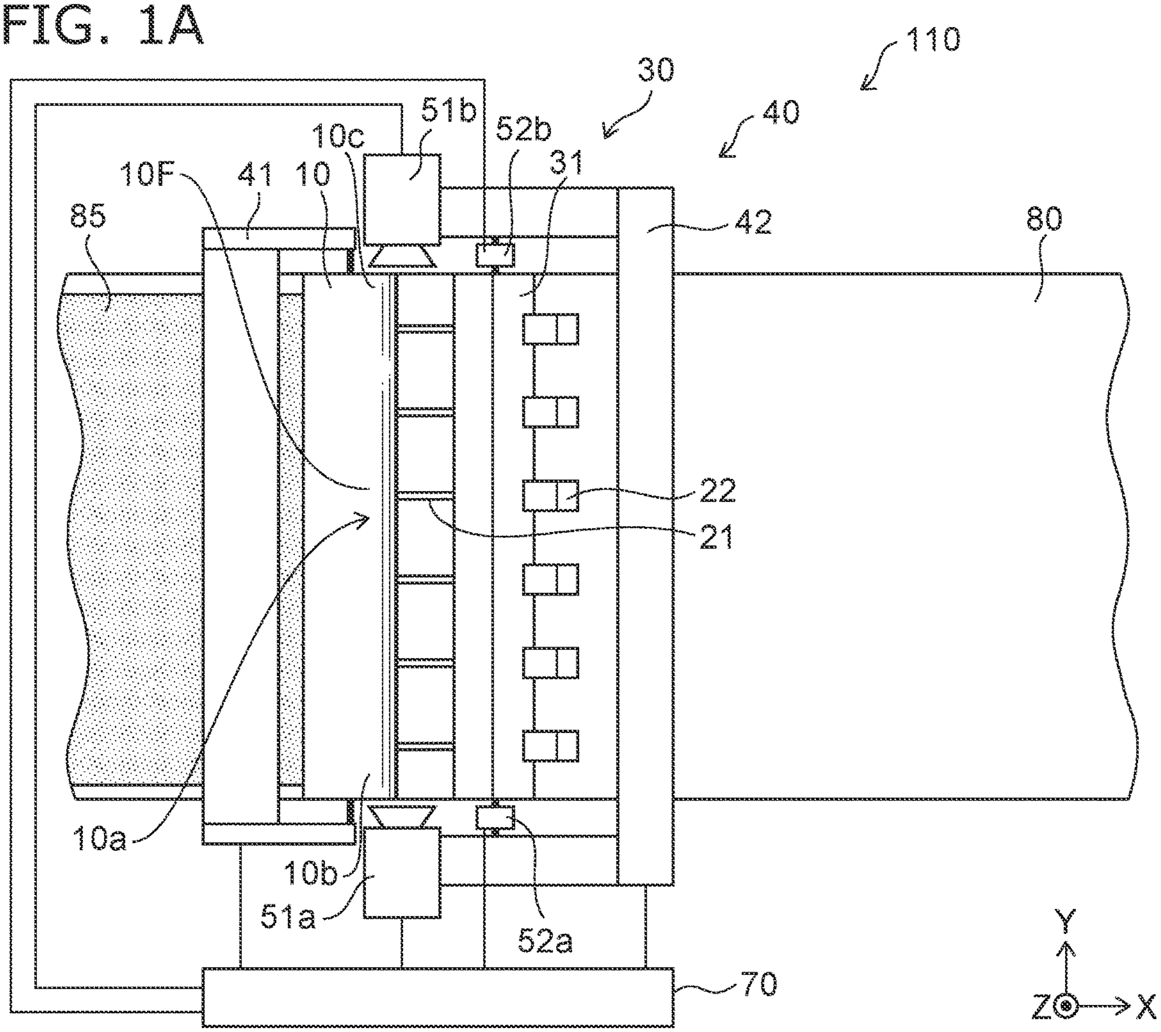
FIGS. 1A and 1B are schematic views illustrating a coating apparatus according to the first embodiment.

According to one embodiment, a coating apparatus includes a coating bar configured to face a member to be coated, and a plurality of nozzles configured to supply a liquid toward the coating bar. A number of the nozzles is 3 or more. An arithmetic mean roughness Ra of at least a part of a surface of the coating bar is not less than 0.5 μm and not more than 10 μm. Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 1B:
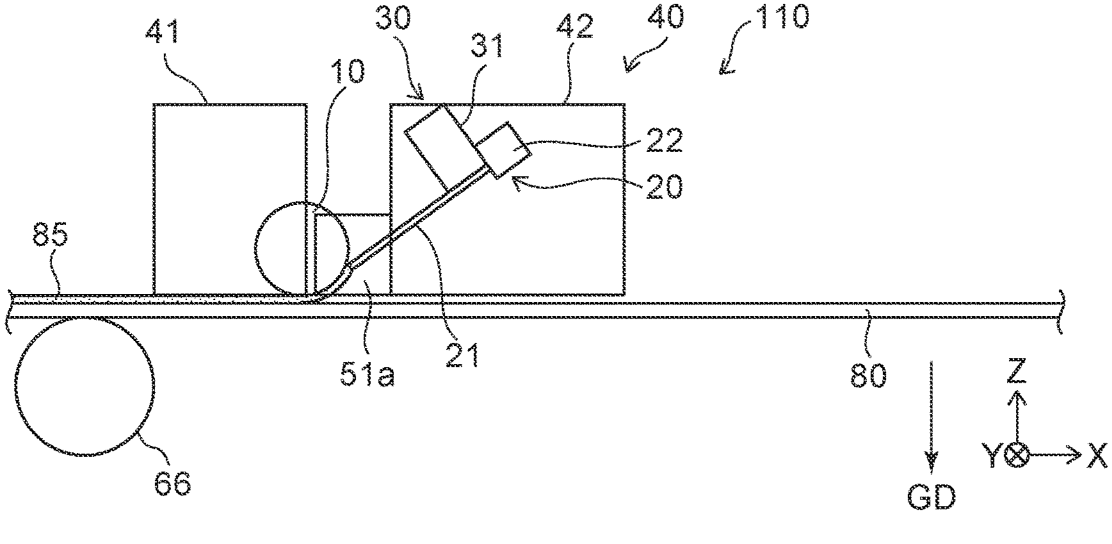

FIGS. 1A and 1B are schematic views illustrating a coating apparatus according to a first embodiment.

FIG. 1A is a top view. FIG. 1B is a side view. In FIG. 1 B, some elements are omitted in order to make the figure easier to see.

Figure 2:
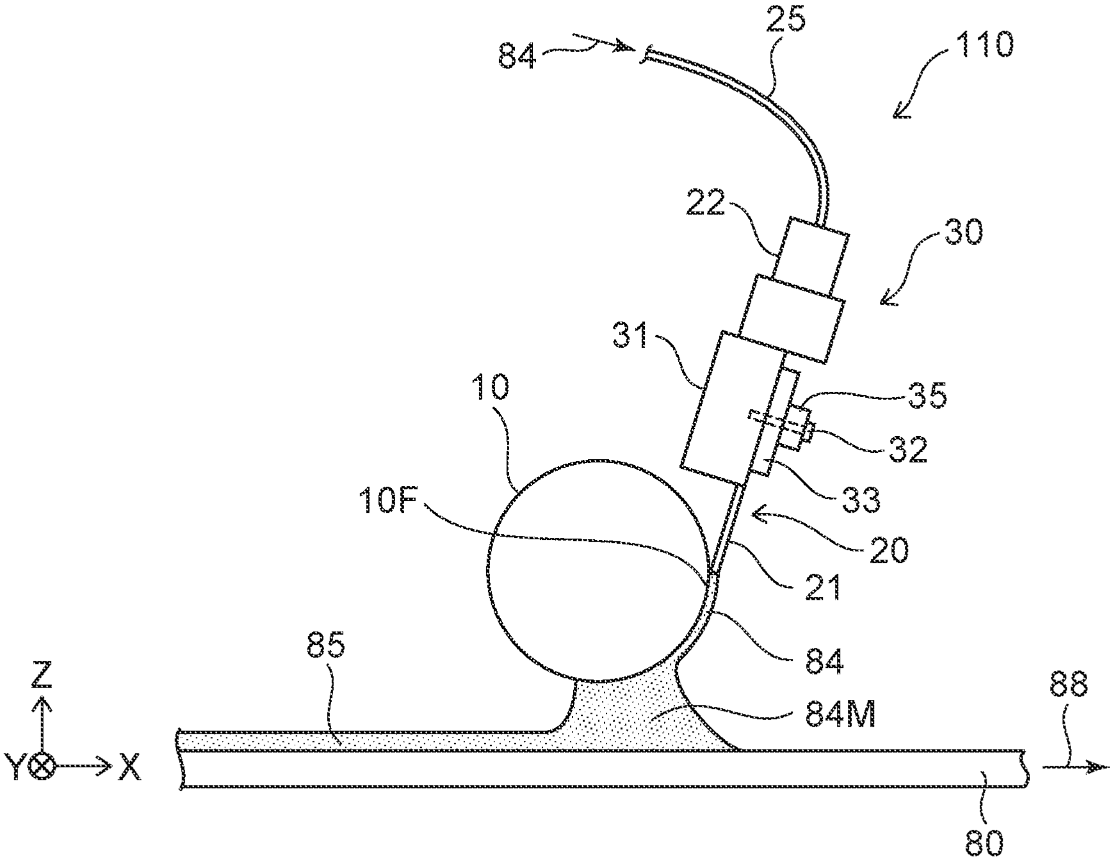
FIG. 2 is a schematic side view illustrating the coating apparatus according to the first embodiment.

FIG. 2 is a schematic side view illustrating the coating apparatus according to the first embodiment.

As shown in FIG. 1A, a coating apparatus 110 according to the embodiment includes a coating bar 10 and a plurality of nozzles 21. The plurality of nozzles 21 may be included in the nozzle part 20.

As shown in FIG. 2, the coating bar 10 is configured to face a member to be coated 80.

As shown in FIGS. 1A and 2, the plurality of nozzles 21 are configured to face the coating bar 10. As shown in FIG. 2, the plurality of nozzles 21 are configured to supply a liquid 84 toward the coating bar 10.

As shown in FIG. 1A, the plurality of nozzles 21 are arranged along a first direction. The first direction is, for example, a Y-axis direction. One direction perpendicular to the Y-axis direction is defined as an X-axis direction. The direction perpendicular to the Y-axis direction and the X-axis direction is defined as a Z-axis direction. The coating bar 10 extends, for example, along the Y-axis direction.

As shown in FIG. 2, a meniscus 84M of the liquid 84 can be formed between the member to be coated 80 and the coating bar 10. When the meniscus 84M comes into contact with the member to be coated 80, a coating film 85 made of the liquid 84 is formed on the member to be coated 80. By solidifying (for example, drying) the coating film 85, the desired film (solid film) can be obtained. For example, by moving the member to be coated 80 along the moving direction 88, it is possible to form the coating film 85 having a large area on the member to be coated 80.

In the embodiment, the number of the plurality of nozzles 21 is 3 or more. As a result, the coating film 85 having a large area can be stably formed. In the example of FIG. 1A, the number of the plurality of nozzles 21 is 6. In embodiments, the number may be any integer greater than or equal to 3.

In the embodiment, a surface 10F of the coating bar 10 is provided with unevenness. The unevenness can be formed by, for example, a method such as sandblasting. By controlling the conditions for forming the unevenness, the arithmetic mean roughness Ra of the unevenness can be controlled. By controlling the conditions for forming the unevenness, a maximum height Rz of the unevenness can be controlled. When a technique such as sandblasting is used, the conditions for forming the unevenness include, for example, at least one of the size of the particles used (for example, the average diameter), the type of particles, and the treatment time.

In the embodiment, the arithmetic mean roughness Ra of the surface 10F of the coating bar 10 is, for example, not less than 0.5 μm and not more than 10 μm. As a result, it was found that the thickness unevenness of the formed coating film 85 can be reduced. For example, the wettability of the surface 10F is improved by providing the surface 10F of the coating bar 10 with unevenness having an appropriate roughness. It is considered that this is the reason why the coating film 85 having a uniform thickness can be easily obtained.

Figure 3A:
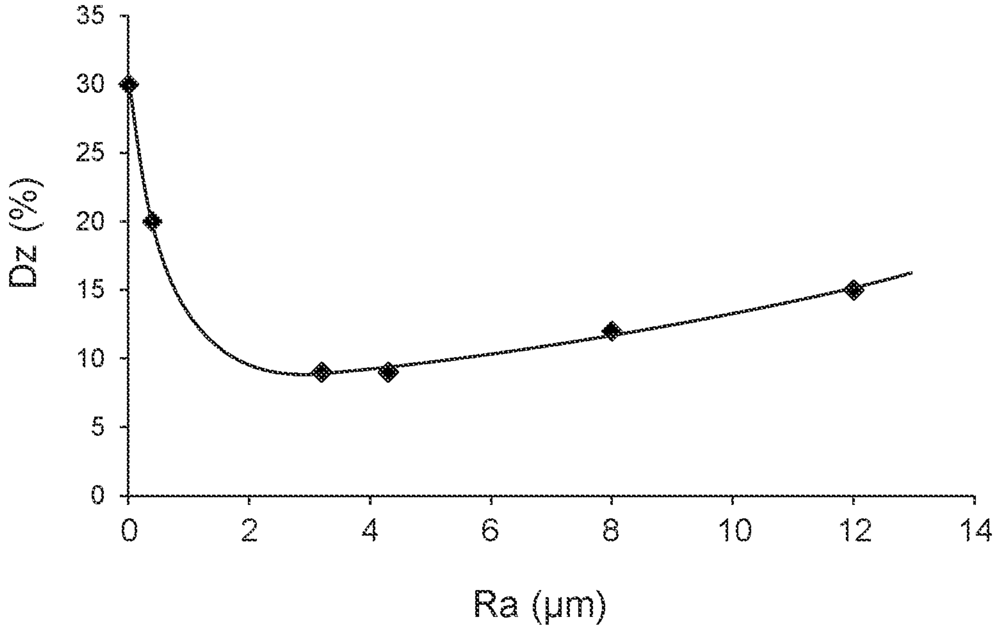
FIGS. 3A and 3B are graphs illustrating the characteristics of the coating apparatus.
Figure 3B:
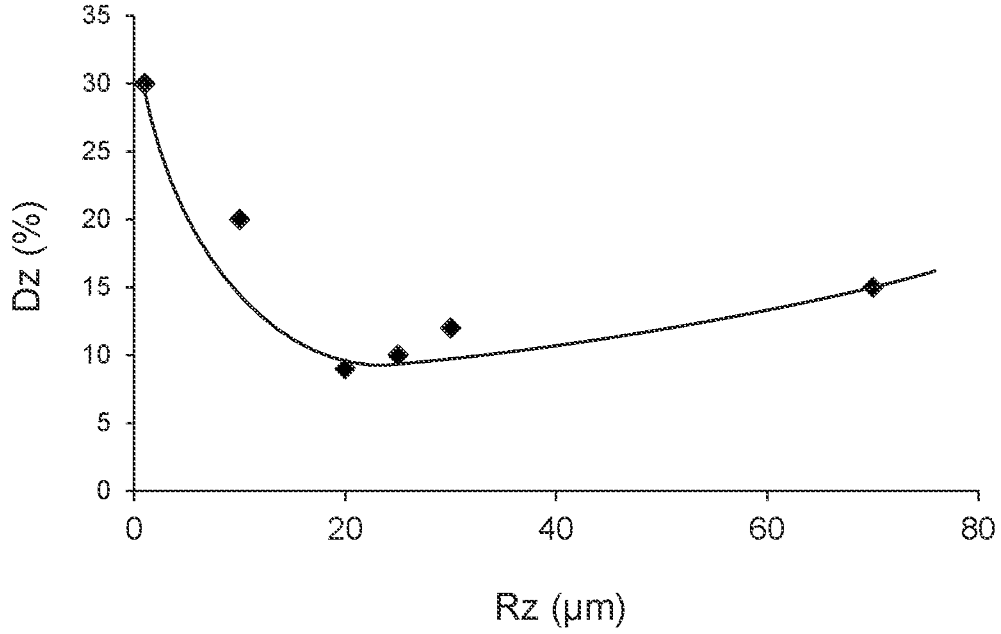

FIGS. 3A and 3B are graphs illustrating the characteristics of the coating apparatus.

The horizontal axis of FIG. 3A is the arithmetic mean roughness Ra of the surface 10F of the coating bar 10. The horizontal axis of FIG. 3B is the maximum height Rz of the unevenness on the surface 10F of the coating bar 10. The vertical axis of these figures is the thickness unevenness Dz of the solid film obtained by the coating film 85. The thickness unevenness Dz is a relative standard deviation (%).

As shown in FIG. 3A, a small thickness unevenness Dz can be obtained in the range where the arithmetic mean roughness Ra is about not less than 3 μm and not more than about 8 μm. Practically, when the arithmetic mean roughness Ra is not less than 0.5 μm and not more than 10 μm, a small thickness unevenness Dz can be obtained. When the arithmetic mean roughness Ra is less than 0.5 μm, the thickness unevenness Dz is large. If the arithmetic mean roughness Ra is larger than 10 μm, the coating bar 10 is likely to become dirty. If the arithmetic mean roughness Ra is larger than 10 μm, it becomes difficult to clean the coating bar 10. The arithmetic mean roughness Ra is, for example, preferably not less than 2 μm and not more than 6 μm.

It is considered that good wettability can be obtained on the surface 10F of the coating bar 10 by providing the unevenness of the arithmetic mean roughness Ra of not less than 0.5 μm and not more than 10 μm. As a result, it is considered that the thickness unevenness Dz can be reduced.

When the number of the plurality of nozzles 21 is 2, tips of the two nozzles 21 are on one straight line. This straight line is, for example, along the extending direction of the coating bar 10. The relative positions between each of the two nozzles 21 and the coating bar 10 are likely to be uniform. Therefore, the appropriate range of the degree of unevenness (for example, arithmetic mean roughness Ra) on the surface 10F of the coating bar 10 is relatively wide.

On the other hand, as already described, in the embodiment, the number of the plurality of nozzles 21 is 3 or more. As a result, a coating film 85 having a large area can be obtained. When the number of the plurality of nozzles 21 is 3 or more, it becomes difficult to make the relative positions between each of the plurality of nozzles 21 and the coating bar 10 uniform. In such a situation, the arithmetic mean roughness Ra in an appropriate range can effectively reduce the thickness unevenness Dz. With an appropriate range of arithmetic mean roughness Ra, for example, due to the capillary effect, a film of liquid 84 can be stably formed on the surface of the coating bar 10. As a result, it is considered that a small thickness unevenness Dz can be obtained.

As shown in FIG. 3B, a small thickness unevenness Dz can be obtained in the range where the maximum height Rz is not less than about 10 μm about not more than 30 μm. Practically, when the maximum height Rz is not less than 5 μm and not more than 50 μm, a small thickness unevenness Dz can be obtained. When the maximum height Rz is smaller than 5 μm, for example, the capillary effect tends to be small. If the maximum height Rz is larger than 50 μm, for example, the coating bar 10 is likely to be contaminated. If the maximum height Rz is larger than 50 μm, for example, the member to be coated 80 is likely to be scratched.

The unevenness of the coating bar 10 may be formed by, for example, sandblasting. By the sandblasting, uniform unevenness can be formed on the curved surface of the coating bar 10. For example, oxidation of the surface 10F of the coating bar 10 is promoted. For example, it is easy to improve the wettability. For example, it is easy to obtain high hydrophilicity.

In the embodiment, the coating bar 10 includes, for example, a metal. The coating bar 10 includes, for example, at least one selected from the group consisting of stainless steel, titanium and aluminum. When the coating bar 10 includes stainless steel, high durability can be easily obtained. When the coating bar 10 includes stainless steel, the cost can be easily reduced.

The surface 10F of the coating bar 10 may include an oxide. The surface 10F may include, for example, aluminum oxide or the like. For example, good wettability can be easily obtained.

The contact angle of the surface 10F of the coating bar 10 with water is, for example, less than 90 degrees. The highly hydrophilic surface 10F makes it easier to obtain a more uniform coating film 85. The contact angle may be 50 degrees or less. The contact angle may be 10 degrees or less.

In the embodiment, the plurality of nozzles 21 may be in contact with the coating bar 10.

As shown in FIG. 2, a position of at least a part of the plurality of nozzles 21 is higher than a position of the coating bar 10. Due to the influence of gravity, a more stable meniscus 84M can be easily obtained. For example, the plurality of nozzles 21 may come into contact with the coating bar 10 from the upper part of the coating bar 10. For example, the liquid 84 can be easily and stably supplied.

As shown in FIG. 1A, the surface 10F of the coating bar 10 includes a first region 10*a*, a second region 10*b*, and a third region 10*c*. In the first direction (for example, the Y-axis direction) in which the plurality of nozzles 21 are arranged, the first region 10*a* is between the second region 10*b* and the third region 10*c*. The first region 10*a* is a region facing the plurality of nozzles 21. The second region 10*b* and the third region 10*c* are regions that do not face the plurality of nozzles 21. The second region 10*b* and the third region 10*c* may include, for example, the end portion of the coating bar 10 in the Y-axis direction.

The arithmetic mean roughness Ra in the first region 10*a* is not less than 0.5 μm and not more than 10 μm. The arithmetic mean roughness Ra in the second region 10*b* and the third region 10*c* is less than 0.5 μm or more than 10 μm. By appropriately setting the arithmetic mean roughness Ra in the first region 10*a* used for coating, a small thickness unevenness Dz can be obtained. For example, in the second region 10*b* and the third region 10*c* corresponding to the end portion, surface characteristics different from the arithmetic mean roughness Ra in the first region 10*a* are applied. As a result, the adhesion of the liquid 84 to the unnecessary portion can be suppressed. The efficiency of using the liquid 84 is improved.

As shown in FIG. 2, in this example, the plurality of nozzles 21 are connected to a base 22. A supply pipe 25 is connected to the base 22. The liquid 84 is supplied to the base 22 via the supply pipe 25. The liquid 84 is discharged from the plurality of nozzles 21.

As shown in FIG. 2, in this example, the nozzle 21 is held by the first member 31 and the third member 33. The nozzle 21 is located between the first member 31 and the third member 33. The third member 33 is fixed to the first member 31 by the second member 32. In this example, an elastic member 35 is provided between the third member 33 and the second member 32. The elastic member 35 makes it easier to stabilize the positions of the plurality of nozzles 21. The nozzle part 20, the first member 31, the second member 32, the third member 33, and the elastic member 35 may be included in the head portion 30. In the embodiment, the configuration relating to the holding of the plurality of nozzles 21 may be variously modified.

As shown in FIG. 1A, the coating apparatus 110 may include a position control part 40. The position control part 40 is configured to control the relative position between the plurality of nozzles 21 and the coating bar 10.

As shown in FIGS. 1A and 1B, for example, the position control part 40 may include a first holding portion 41 and a second holding portion 42. The first holding portion 41 holds the coating bar 10. The second holding portion 42 holds the plurality of nozzles 21. For example, the first member 31 is held by the second holding portion 42. As a result, the plurality of nozzles 21 held by the first member 31 are held by the second holding portion 42.

At least one of the first holding portion 41 and the second holding portion 42 may be possible apply a stress having at least one of an orientation from the coating bar 10 to the plurality of nozzles 21 and an orientation from the plurality of nozzles 21 to the coating bar 10 to at least one of the coating bar 10 and the plurality of nozzles 21.

In the embodiment, an interval between the plurality of nozzles 21 may be variable. The interval corresponds to the distance along the Y-axis direction illustrated in FIG. 1A.

As shown in FIG. 1A, the coating apparatus 110 may include the first sensors 51*a* and 51*b*. The first sensors 51*a* and 51*b* detect, for example, a distance between the coating bar 10 and the member to be coated 80.

As shown in FIG. 1A, the coating apparatus 110 may include a control part 70. The control part 70 obtains, for example, a detection results of the first sensors 51*a* and 51*b*, and controls the position control part 40 (for example, the first holding portion 41) based on the detection results. The control part 70 appropriately controls the distance between the coating bar 10 and the member to be coated 80. The first sensors 51*a* and 51*b* include, for example, an optical element. The first sensors 51*a* and 51*b* may include, for example, a camera.

As shown in FIG. 1B, the coating apparatus 110 may include a member to be coated holding portion 66. The member to be coated holding portion 66 holds the member to be coated 80. The member to be coated holding portion 66 can move the member to be coated 80 relative to the coating bar 10. The member to be coated holding portion 66 is, for example, a transporting portion. The member to be coated holding portion 66 is, for example, a roller. In this example, the member to be coated holding portion 66 can convey the member to be coated 80 along the direction crossing the orientation of the gravity GD. The orientation of gravity GD is, for example, along the Z-axis direction. The crossing direction is, for example, the X-axis direction.

For example, the transport direction (movement direction 88) is along the horizontal direction. In this case, the extending direction of the plurality of nozzles 21 is, for example, close to the horizontal direction. Alignment is easy. For example, the dripping of the liquid 84 can be suppressed.

Figure 4:
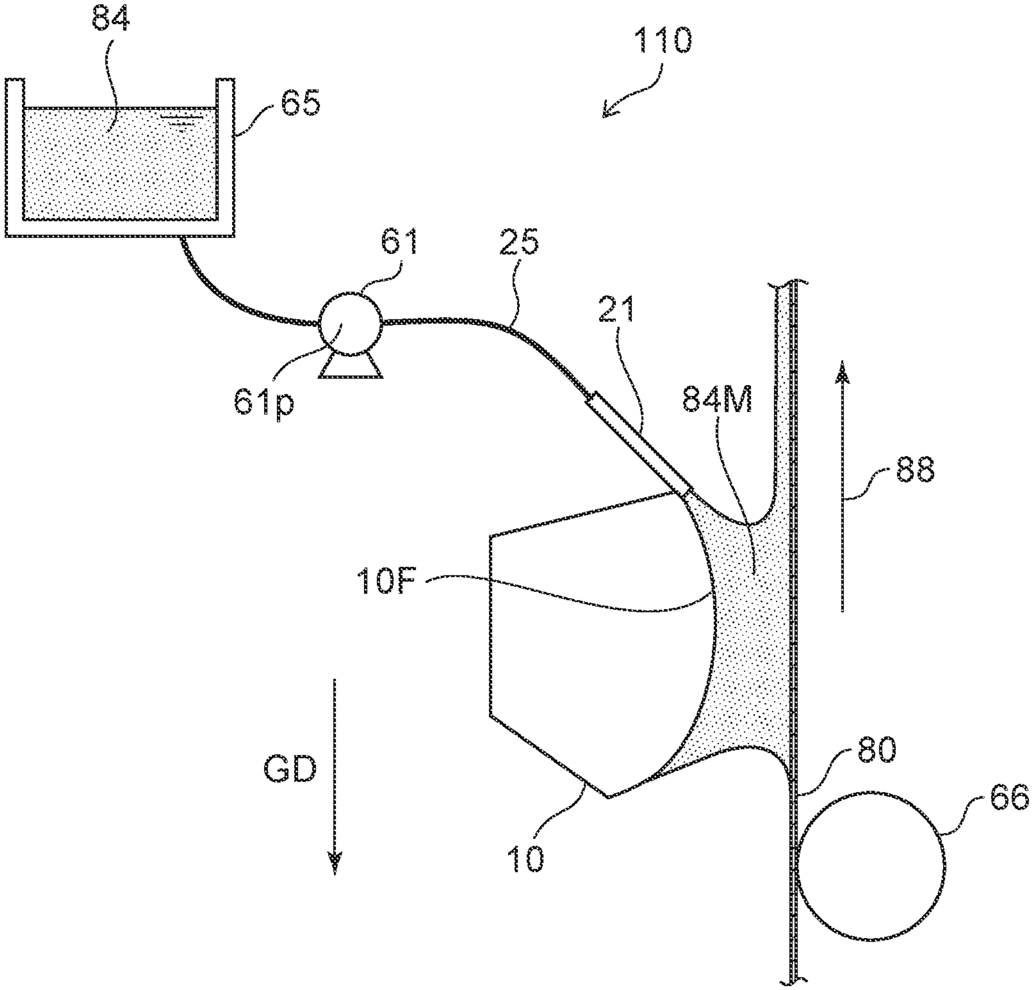
FIG. 4 is a schematic view illustrating the coating apparatus according to the first embodiment.

FIG. 4 is a schematic view illustrating the coating apparatus according to the first embodiment.

As shown in FIG. 4, the coating apparatus 110 includes the member to be coated holding portion 66. The member to be coated holding portion 66 holds the member to be coated 80. The member to be coated holding portion 66 moves the member to be coated 80 relative to the coating bar 10. In this example, the member to be coated holding portion 66 can convey the member to be coated 80 in the direction 88*a* including a component opposite to the orientation of the gravity GD. For example, gravity is applied to the meniscus 84M. Even in high-speed coating, it is easy to obtain a uniform coating film 85.

In the embodiment, the moving direction of the member to be coated 80 can be variously deformed. The angle between the direction of movement and the orientation (direction) of gravity may be, for example, ±30° or less.

As shown in FIG. 4, the coating apparatus 110 may include a supply part 61. The supply part 61 is configured to supply the liquid 84 to the plurality of nozzles 21. The supply part 61 includes, for example, a pump 61*p*. In this example, a tank 65 for storing the liquid 84 is provided. The supply part 61 is connected to the tank 65. The supply part 61 is connected to the plurality of nozzles 21 by the supply pipe 25. The liquid 84 is supplied from the supply part 61 to the plurality of nozzles 21. The liquid 84 is supplied from the plurality of nozzles 21 toward the coating bar 10.

The supply part 61 may include a plurality of pumps 61*p*. The number of the plurality of nozzles 21 is, for example, an integral multiple of the number of the plurality of pumps 61*p*.

In the embodiment, the number of the plurality of nozzles 21 may be 12 or more. The number of the plurality of nozzles 21 is, for example, 12, 16 or 20. The supply pipe 25 connecting the pump 61*p* and the plurality of nozzles 21 may have a branched structure. The number of supply pipes 25 is, for example, 2, 4, or 8. For example, when the number of supply pipes 25 is 4, the liquid 84 can be stably and uniformly supplied with a small number of pumps 61*p*.

In the embodiment, the pump 61*p* may include, for example, a diaphragm pump. The diaphragm pump can be applied to a liquid 84 including various solvents.

Figure 5:
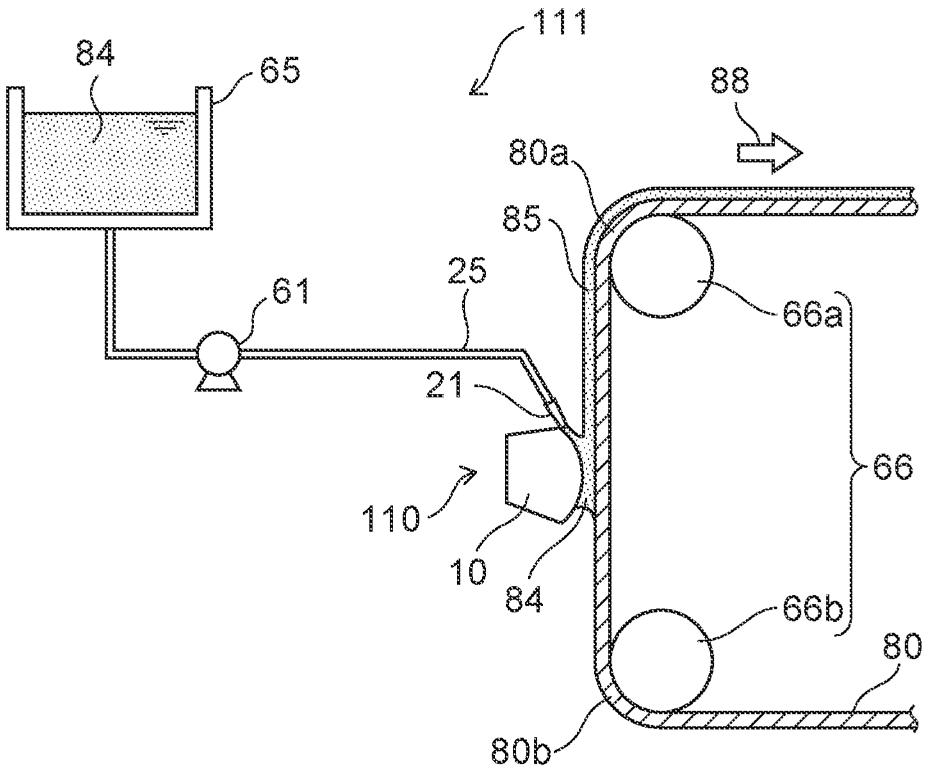
FIG. 5 is a schematic view illustrating the coating apparatus according to the first embodiment.

FIG. 5 is a schematic view illustrating the coating apparatus according to the first embodiment.

As shown in FIG. 5, in a coating apparatus 111, the member to be coated holding portion 66 includes a first holding mechanism 66*a* and a second holding mechanism 66*b*. In this example, the member to be coated 80 includes a roll-shaped film. The first holding mechanism 66*a* holds a first portion 80*a* of the roll-shaped film (member to be coated 80). The second holding mechanism 66*b* holds a second portion 80*b* of the roll-shaped film (member to be coated 80). The first holding mechanism 66*a* and the second holding mechanism 66*b* are, for example, rollers. Continuous coating to roll film is possible.

At least a part of the cross section of the coating bar 10 in a plane (for example, the X-X plane) crossing the first direction (Y-axis direction) in which the plurality of nozzles 21 are arranged may be circular. The cross section may be a circle, an ellipse, a trapezoid, or the like. When the cross section is circular, the coating head can be easily manufactured. When the cross section is circular, it is easy to maintain a uniform distance between the member to be coated 80 and the coating bar 10. A part of the cross section may be curved, and the other part of the cross section may be straight.

In the embodiment, the plurality of nozzles 21 may be needle-shaped. In the needle shape, the length is longer than the diameter. The openings of the plurality of nozzles 21 may be substantially 90 degrees with respect to the extending direction of the plurality of nozzles 21. In this case, even when the plurality of nozzles 21 rotate, the relative positional relationship between the openings (ends) of the plurality of nozzles 21 and the coating bar 10 is unlikely to change. For example, it is easy to suppress scratches on the coating bar 10 caused by at least one of the plurality of nozzles 21.

The length of the plurality of nozzles 21 may be, for example, not less than 2 cm and not more than 10 cm. The inner diameter of the plurality of nozzles 21 is, for example, not less than 0.2 and mot more than 2 mm.

In the embodiment, a collection unit for collecting the liquid 84 may be provided. In the embodiment, a drying portion capable of solidifying the coating film 85 may be provided. The drying portion may include, for example, a heater, a blower, an infrared irradiation portion, or the like.

In the embodiment, a cleaning portion capable of cleaning the coating bar 10 may be provided. The cleaning portion may include a mechanism for spraying or radiating a solvent. The solvent may include, for example, water. The cleaning unit may include a mechanism for applying ultrasonic waves.

For example, a film included in a solar cell may be formed by the coating apparatus according to the embodiment. For example, the member to be coated 80 may be a roll-shaped film.

The following is an example of the experimental results. In the experiment, the member to be coated 80 is a roll-shaped PET film. The width (length in the Y-axis direction) of the PET film is 300 mm. A light-transmitting conductive film is formed on a roll-shaped film by a roll-to-roll sputtering device. The conductive film is an ITO/Ag alloy/ITO laminated film. The conductive film is patterned into a desired shape.

The length of one of the plurality of nozzles 21 is about 50 mm. The plurality of nozzles 21 include stainless steel. The inner diameter of each of the plurality of nozzles 21 is 0.8 mm. The plurality of nozzles 21 are fixed to the first member 31 by the second member 32 by using the third member 33 and the elastic member 35. The supply pipe 25 is connected to the bases 22 of the plurality of nozzles 21.

In the experiment, a PEDOT/PSS aqueous dispersion is used as the liquid 84. From this liquid 84, for example, a hole-transport layer of a solar cell can be produced.

The cross-sectional shape of the coating bar 10 is substantially trapezoidal. The bottom of the cross-sectional shape of the coating bar 10 is an arc shape having a curvature of 80 mm. The length of the coating bar 10 in the Y-axis direction is 300 mm. The material of the coating bar 10 is SUS303.

In the experiment, sandblasting is performed on the bottom surface of the coating bar 10 and the surface next to the bottom surface. As a result, unevenness is formed on the surface 10F of the coating bar 10. Depending on the treatment conditions, various characteristics can be obtained on the surface 10F of the coating bar 10. Alternatively, various unevenness can be formed on the surface 10F by various surface treatments.

The liquid 84 is coated using the coating bar 10 under various conditions. As a result, the coating film 85 is obtained. The coating film 85 is dried to obtain the desired film. Thickness unevenness Dz is evaluated from the distribution of the absorbance of the film.

In a first sample, the arithmetic mean roughness Ra of the surface 10F of the coating bar 10 is 3.2 μm. The maximum height Rz of the unevenness is 20 μm. The surface 10F is visually uniform. On the surface 10F, the contact angle with water is about 5 degrees. In the first sample, the thickness unevenness Dz is 10% or less.

In a second sample, the surface of the coating bar 10 is not sandblasted. In the second sample, the arithmetic mean roughness Ra is 0.4 μm. The maximum height Rz of the unevenness is 10 μm. In the second sample, the thickness unevenness Dz is 20% or more.

In a third sample, the arithmetic mean roughness Ra is 12 μm. The maximum height Rz of the unevenness is 70 μm. In the third sample, the thickness unevenness Dz is 15% or more. In the third sample, the coating bar 10 is easily contaminated and difficult to clean.

In a fourth sample, the arithmetic mean roughness Ra is 0.006 μm. The maximum height Rz of the unevenness is 10 μm. In the fourth sample, the thickness unevenness Dz is 30% or more.

In a fifth sample, the arithmetic mean roughness Ra is 4.3 μm. The maximum height Rz of the unevenness is 25 μm. In the fifth sample, the thickness unevenness Dz is 10% or less. In the first sample to the fifth sample, the material of the coating bar 10 is stainless steel.

In a sixth sample, the material of the coating bar 10 is aluminum. In the fifth sample, the arithmetic mean roughness Ra is 8 μm. The maximum height Rz of the unevenness is 30 μm. In the fifth sample, the thickness unevenness Dz is 12% or less.

Second Embodiment

A second embodiment relates to a coating method. In the coating method, the liquid 84 is coated on the member to be coated 80 by any coating apparatus according to the first embodiment. A uniform coating film 85 can be formed.

For example, there are organic thin-film solar cells using organic semiconductors or organic/inorganic hybrid solar cells. For example, a low-cost solar cell can be obtained by forming a layer contained in the solar cell by coating. According to the embodiment, for example, roll-to-roll coating provides a uniform coating film. In the embodiment, for example, the meniscus 84M is formed between the coating bar 10 and the member to be coated 80. A uniform coating film 85 can be obtained by the coating bar 10 having an appropriate surface condition.

The embodiments may include the following configurations (for example, technical proposals).

(Configuration 1)

A coating apparatus, comprising:

- a coating bar configured to face a member to be coated; and
- a plurality of nozzles configured to supply a liquid toward the coating bar,
- a number of the nozzles is 3 or more, and
- an arithmetic mean roughness Ra of at least a part of a surface of the coating bar is not less than 0.5 μm and not more than 10 μm.

(Configuration 2)

The coating apparatus according to configuration 1, wherein

- at least a part of the surface includes unevenness, and
- a maximum height Rz of the unevenness is not less than 5 μm and not more than 50 μm.

(Configuration 3)

The coating apparatus according to configuration 1 or 2, wherein the coating bar includes at least one selected from the group consisting of stainless steel, titanium and aluminum.

(Configuration 4)

The coating apparatus according to any one of configurations 1-3, wherein the surface includes oxides.

(Configuration 5)

The coating apparatus according to any one of configurations 1-4, wherein a contact angle of the surface with water is less than 90 degrees.

(Configuration 6)

The coating apparatus according to any one of configurations 1-5, wherein a meniscus of the liquid is configured to be formed between the member to be coated and the coating bar.

(Configuration 7)

The coating apparatus according to any one of configurations 1-6, wherein the plurality of nozzles are in contact with the coating bar.

(Configuration 8)

The coating apparatus according to any one of configurations 1-7, wherein a position of at least a part of the plurality of nozzles is higher than a position of the coating bar.

(Configuration 9)

The coating apparatus according to any one of configurations 1-8, further comprising a member to be coated holding portion configured to hold the member to be coated and to move the member to be coated relative to the coating bar, and the member to be coated holding portion is configured to convey the member to be coated in a direction including a component opposite to an orientation of a gravity.

(Configuration 10)

The coating apparatus according to any one of configurations 1-8, further comprising a member to be coated holding portion configured to hold the member to be coated and to move the member to be coated relative to the coating bar, and the member to be coated holding portion is configured to convey the member to be coated along a first direction crossing an orientation of a gravity.

(Configuration 11)

The coating apparatus according to configuration 9 or 10, wherein the member to be coated includes a roll-shaped film, and the member to be coated holding portion includes, a first holding mechanism configured to hold a first portion of the roll-shaped film, and a second holding mechanism configured to hold a second portion of the roll-shaped film.

(Configuration 12)

The coating apparatus according to any one of configurations 9-11, further comprising a supply part to supply the liquid to the plurality of nozzles.

(Configuration 13)

The coating apparatus according to configuration 12, wherein the supply part includes a plurality of pumps, and a number of the plurality of nozzles is an integral multiple of a number of the plurality of pumps.

(Configuration 14)

The coating apparatus according to any one of configurations 1-13, wherein a number of the plurality of nozzles is 12 or more.

(Configuration 15)

The coating apparatus according to any one of configurations 1-14, wherein a cross section of at least a part of the coating bar in a plane crossing a first direction in which the plurality of nozzles are arranged is circular.

(Configuration 16)

The coating apparatus according to any one of configurations 1-15, wherein the surface includes a first region, a second region and a third region, in a first direction in which the plurality of nozzles are arranged, the first region is between the second region and the third region, an arithmetic mean roughness Ra in the first region is not less than 0.5 μm and not more than 10 μm, and an arithmetic mean roughness Ra in the second region and the third region is less than 0.5 μm or more than 10 μm.

(Configuration 17)

The coating apparatus according to any one of configurations 1-16, further comprising a position control part configured to control a relative position between the plurality of nozzles and the coating bar.

(Configuration 18)

The coating apparatus according to configuration 17, wherein the position control part includes a first holding portion configured to hold the coating bar, and a second holding portion configured to hold the multiple nozzles, and at least one of the first holding portion and the second holding portion is configured to apply a stress having at least one of an orientation from the coating bar to the plurality of nozzles and an orientation from the plurality of nozzles to the coating bar to at least one of the coating bar and the plurality of nozzles.

(Configuration 19)

The coating apparatus according to any one of configurations 1-18, wherein a spacing between the plurality of nozzles is variable.

(Configuration 20)

A coating method comprising;

coating the liquid to the member to be coated by the coating apparatus according to any one of configurations 1-19.

According to the embodiment, a coating apparatus and a coating method capable of forming a uniform coating film are provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in coating apparatus such as coating bars, nozzles, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all coating apparatuses and coating methods practicable by an appropriate design modification by one skilled in the art based on the coating apparatuses and coating methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A coating apparatus, comprising:

a coating bar configured to face a member to be coated; and a plurality of nozzles configured to supply a liquid toward the coating bar, wherein a number of the nozzles is 3 or more, an arithmetic mean roughness Ra of at least a part of a surface of the coating bar is not less than 0.5 μm and not more than 10 μm, the coating bar includes at least one selected from the group consisting of stainless steel, titanium, and aluminum, the surface includes an oxide of the at least one selected from the group consisting of stainless steel, titanium, and aluminum, and a contact angle of the surface with respect to water is 50 degrees or less.

2. The coating apparatus according to claim 1, wherein at least the part of the surface includes unevenness, and a maximum height Rz of the unevenness is not less than 5 μm and not more than 50 μm.

3. The coating apparatus according to claim 1, wherein a meniscus of the liquid is configured to be formed between the member to be coated and the coating bar.

4. The coating apparatus according to claim 1, wherein the plurality of nozzles are in contact with the coating bar.

5. The coating apparatus according to claim 1, wherein a position of at least a part of the plurality of nozzles is higher than a position of the coating bar.

6. The coating apparatus according to claim 1, further comprising a member to be coated holding portion configured to hold the member to be coated and to move the member to be coated relative to the coating bar, and the member to be coated holding portion is configured to convey the member to be coated in a direction including a component opposite to an orientation of a gravity.

7. The coating apparatus according to claim 6, wherein the member to be coated includes a roll-shaped film, and the member to be coated holding portion includes, a first holding mechanism configured to hold a first portion of the roll-shaped film, and a second holding mechanism configured to hold a second portion of the roll-shaped film.

8. The coating apparatus according to claim 6, further comprising a supply part to supply the liquid to the plurality of nozzles.

9. The coating apparatus according to claim 8, wherein the supply part includes a plurality of pumps, and a number of the plurality of nozzles is an integral multiple of a number of the plurality of pumps.

10. The coating apparatus according to claim 1, further comprising a member to be coated holding portion configured to hold the member to be coated and to move the member to be coated relative to the coating bar, and the member to be coated holding portion is configured to convey the member to be coated along a first direction crossing an orientation of a gravity.

11. The coating apparatus according to claim 1, wherein a number of the plurality of nozzles is 12 or more.

12. The coating apparatus according to claim 1, wherein a cross section of at least a part of the coating bar in a plane crossing a first direction in which the plurality of nozzles are arranged is circular.

13. The coating apparatus according to claim 1, wherein the surface includes a first region, a second region and a third region, in a first direction in which the plurality of nozzles are arranged, the first region is between the second region and the third region an arithmetic mean roughness Ra in the first region is not less than 0.5 μm and not more than 10 μm, and an arithmetic mean roughness Ra in the second region and the third region is less than 0.5 μm or more than 10 μm.

14. The coating apparatus according to claim 1, further comprising a position control part configured to control a relative position between the plurality of nozzles and the coating bar.

15. The coating apparatus according to claim 14, wherein the position control part includes a first holding portion configured to hold the coating bar, and a second holding portion configured to hold the multiple nozzles, and at least one of the first holding portion and the second holding portion is configured to apply a stress having at least one of an orientation from the coating bar to the plurality of nozzles and an orientation from the plurality of nozzles to the coating bar to at least one of the coating bar and the plurality of nozzles.

16. The coating apparatus according to claim 1, wherein a spacing between the plurality of nozzles is variable.

17. A coating method comprising;

coating the liquid to the member to be coated by the coating apparatus according to claim 1.

* * * * *